(12) United States Patent
Guo et al.

(10) Patent No.: US 12,101,127 B2
(45) Date of Patent: Sep. 24, 2024

(54) BINARY ITERATIVE CLOCK SYNCHRONIZATION SYSTEM BASED ON POLARIZATION ENTANGLEMENT GHZ STATE AND METHOD THEREOF

(71) Applicant: NATIONAL QUANTUM COMMUNICATION (GUANGDONG) CO., LTD, Guangdong (CN)

(72) Inventors: Banghong Guo, Guangdong (CN); Gang Liu, Guangdong (CN)

(73) Assignee: NATIONAL QUANTUM COMMUNICATION (GUANGDONG) CO., LTD, Zhaoqing (CN)

( * ) Notice: Subject to any disclaimer, the term of this patent is extended or adjusted under 35 U.S.C. 154(b) by 323 days.

(21) Appl. No.: 17/362,977

(22) Filed: Jun. 29, 2021

(65) Prior Publication Data

US 2022/0029711 A1    Jan. 27, 2022

Related U.S. Application Data

(63) Continuation of application No. PCT/CN2019/129497, filed on Dec. 27, 2019.

(30) Foreign Application Priority Data

Dec. 31, 2018  (CN) .......................... 201811654915.9

(51) Int. Cl.
*H04B 10/70* (2013.01)
*H04B 10/50* (2013.01)
*H04L 7/00* (2006.01)

(52) U.S. Cl.
CPC ........... *H04B 10/70* (2013.01); *H04B 10/503* (2013.01); *H04L 7/00* (2013.01)

(58) Field of Classification Search
CPC .......... H04B 10/70; H04B 10/503; H04L 7/00
(Continued)

(56) References Cited

U.S. PATENT DOCUMENTS 11,251,952 B2 * 2/2022 Lamas-Linares ..... H04L 7/0075
11,575,456 B2 * 2/2023 Lamas-Linares ..... H04J 3/0638
(Continued)

FOREIGN PATENT DOCUMENTS

| CN | 102955163 A | 3/2013 |
|---|---|---|
| CN | 108718218 A | 10/2018 |

(Continued)

OTHER PUBLICATIONS

Thomas Jennewein et al., Quantum Cryptography with Entangled Photons, Physical Review Letters, May 15, 2000, pp. 4729-4732, vol. 84, No. 20.
(Continued)

*Primary Examiner* — Mohammad R Sedighian (57) ABSTRACT

The disclosure provides a binary iterative clock synchronization system based on polarization entanglement GHZ state comprising a first synchronization party, a second synchronization party and an emitting party; the first synchronization party is connected with the second synchronization party through a classical channel, the emitting party is connected with the first synchronization party through a quantum channel, and the emitting party is connected with the second synchronization party through a quantum channel and a classical channel; the emitting party realizes the preparation of three-photon polarization entangled GHZ states and measures one of the photon polarization states; the first synchronization party and the second synchronization party perform measurement on the polarization states of the other two photons, and the second synchronization party and the emitting party compare the measurement results to (Continued)

obtain the measurement sequence information between the first synchronization party and the second synchronization party.

9 Claims, 4 Drawing Sheets

(58) Field of Classification Search
USPC .......................................................... 398/154
See application file for complete search history.

(56) References Cited

U.S. PATENT DOCUMENTS

| | | |
|---|---|---|
| 2003/0034814 A1 | 2/2003 | Chen et al. |
| 2013/0300466 A1 | 11/2013 | Wilkinson et al. |
| 2014/0270802 A1 | 9/2014 | Silverman et al. |
| 2022/0416906 A1* | 12/2022 | Solmeyer .................. G04F 5/14 |

FOREIGN PATENT DOCUMENTS

| | | | |
|---|---|---|---|
| CN | 111323986 B * | 7/2022 | ........... G02F 1/3501 |
| JP | 2007074302 A * | 3/2007 | ............... H04L 9/12 |
| KR | 20180128646 A | 12/2018 | |

OTHER PUBLICATIONS

Hoi-Kwong Lo et al., Measurement-Device-Independent Quantum Key Distribution, Physical Review Letters, Mar. 30, 2012, pp. 130503-1-130503-5, vol. 108.

Lan Zhou et al., Device-independent quantum secure direct communication against collective attacks, Science Bulletin, 2020, vol. 65, pp. 12-20.

Won-Young Hwang, Quantum Key Distribution with High Loss: Toward Global Secure Communication, Physical Review Letters, May 19, 2003, pp. 1-4.

Zhang, Yu, Study in the quantum measurement of frequency entangled photon source, A Thesis Submitted to The University of Chinese Academy of Sciences In partial fulfillment of the requirement For the degree of Master of Engineering in Communication and Information Technology, May 2013.

* cited by examiner

BINARY ITERATIVE CLOCK SYNCHRONIZATION SYSTEM BASED ON POLARIZATION ENTANGLEMENT GHZ STATE AND METHOD THEREOF

CROSS REFERENCE TO RELATED APPLICATIONS

The present application is a Continuation Application of PCT Application No. PCT/CN2019/129497 filed on Dec. 27, 2019, which claims the benefit of Chinese Patent Application No. 201811654915.9 filed on Dec. 31, 2018. All the above are hereby incorporated by reference in their entirety.

TECHNICAL FIELD

The disclosure relates to the technical field of quantum information and optical communication, in particular to a binary iterative clock synchronization system based on polarization entanglement GHZ state and method thereof.

BACKGROUND

High-precision clock synchronization plays an important role in basic scientific research, information security, communication, navigation, homeland security and other applications. With the continuous development of modern atomic clock technology, the accuracy of the clock reaches $10^{-18}$ s. In contrast, the accuracy of the clock synchronization technique is only $10^{-9}$ s, which is far from the accuracy of the clock itself. In precision time applications, the resolution and accuracy of clock synchronization techniques will become a major limiting factor. Therefore, researches for improving the accuracy of the clock synchronization technology are receiving attention from researchers.

There are two classical approaches to time synchronization of spatially separated clocks: Eddington slow clock transmission and Einstein optical handshake synchronization. In the Eddington slow clock transmission, the two co-located clocks are initially synchronized, and then one of these clocks is slowly passed to the other location to synchronize the other clock. This method is not practical for most of today's technical applications. Firstly, it requires hardware transmission, so the cost and efficiency are difficult to meet the practical application requirements. Secondly, there is technical requirement conflicts with each other: on the one hand, the clock transmission process must be as slow as possible to reduce the effect of time expansion due to relativistic effects; on the other hand, however, the transmission process must be completed as quickly as possible to avoid significant timing errors because of unavoidable timing errors and limited frequency stability. These factors make it difficult to improve the synchronization accuracy and efficiency of the Eddington slow clock transmission method, which limits its practical application.

The widely used time synchronization technology at present is mainly based on the Einstein protocol, which is a bidirectional protocol, and the classical optical signal is round-trip exchanged between two spatially-separated clocks. However, the Einstein protocol must meet the conditions: (1) the exact speed value of the one-way light is known; (2) the signal transmission speed in each direction is ensured to be the same. In addition, for the Einstein clock synchronization protocol, the accuracy which time synchronization may be achieved is determined by the accuracy $\Delta t$ of the measured pulse arrival time. Therefore, the synchronization accuracy of the classical method is limited by the classical limit of $\Delta t$—the shot noise limit.

In order to make the precision of clock synchronization break through the measurement precision limit of shot noise limit, in recent years, several clock synchronization schemes based on quantum mechanics principle are proposed. It is desirable that quantum mechanical methods provide higher clock synchronization accuracy than classical methods.

Chuang proposed a quantum clock synchronization algorithm (QCS) in 2001 that achieves n-bit precision of the clock difference $\Delta T$ with only n quantum bits were exchanged. The quantum algorithm achieves an exponential improvement compared to the classical algorithm, but the algorithm relies on quantum computation, and it is difficult to put these protocols into practical use in a practical environment before quantum computation matures.

Bander and Golding et al proposed quantum synchronization schemes based on second-order quantum interference effects in 2004. The proposal uses the entangled light as the optical signal, and uses the HOM interferometer to measure the relative offset between the optical signals, thereby having higher synchronization precision. However, in this scheme, the optical signal is also transmitted in two directions, and it is necessary to ensure the same signal transmission speed in each direction, which limits its applicability to some extent.

In the prior art, patent 201611081905.1 attempts to obtain a time signal at a receiving end by using a fiber time synchronization method, which has the advantage of high accuracy, and accurately implement time synchronization, but it is difficult to break through the shot noise limit.

In the prior art, patent 201810436641.X attempts to use a frequency-entangled light source as a carrier of a time signal, so as to break through the shot noise limit, but it uses bidirectional transmission, so that there are inevitably high requirements on the propagation speed of an optical signal in different directions along an optical fiber.

SUMMARY OF THE DISCLOSURE

The disclosure is directed to overcome the defects of the prior art and provides a binary iterative clock synchronization system based on polarization entanglement GHZ state and method thereof with unidirectional transmission, high precision and adjustable precision.

The polarization entangled GHZ state is a three-photon polarization entangled state with a quantum state $$\phi_0^\pm = \frac{1}{\sqrt{2}}(|H\rangle|H\rangle|H\rangle \pm |V\rangle|V\rangle|V\rangle),$$

wherein $|H\rangle$ representing horizontal polarization state and $|V\rangle$ representing vertical polarization state, and $$\frac{1}{\sqrt{2}}$$

is a normalization coefficient. According to quantum mechanical theory, measurement of the polarization state of any one photon in the entangled state will result in the polarization states of the remaining two photons collapsing to the same state, namely, measuring the polarization state of any one photon will collapse the state $$\phi_0^\pm = \frac{1}{\sqrt{2}}(|H\rangle|H\rangle|H\rangle \pm |V\rangle|V\rangle|V\rangle) \text{ to } \phi_1 = |H\rangle|H\rangle|H\rangle \text{ or } \phi_2 = |V\rangle|V\rangle|V\rangle$$

with equal probability. And different measurement bases will collapse the entangled state onto different measurement substrates. For example, if Z-basis (i.e., horizontal and vertical) measurements are made on the entangled state, then the photon polarization direction will also collapse to the horizontal or vertical direction with equal probability. Accordingly, if X-basis (i.e., 45-degree and 135-degree direction) measurements are made on the entangled state, then the photon polarization direction will collapse to either the 45-degree or 135-degree direction with equal probability. If two of the three measurers select the same measuring basis and the remaining one selects a different measuring basis, it can be determined the measuring sequence of these two opposing sides selecting different measuring basis according to the measuring result.

The binary iteration is a method that can gradually equalize the two unknowns. Specifically, when two unknown numbers, namely x and y, |x−y|≤Δ, and the magnitude sequence of x and y is known all the time, perform addition and subtraction on one of the two numbers time and again according to the magnitude sequence of x and y, so that its numerical value approaches the other number continuously. Specifically, for example, the unknown number x is adjusted to approach y, and if x>y at the initial time, then perform arithmetic x=x−Δ; otherwise, perform arithmetic x=x+Δ; After the arithmetic, execute a second round of arithmetic again according to the magnitude sequence of x and y. In the second round of arithmetic, x is added or subtracted according to the same rule, except that the variation of the second round of arithmetic is half of that of the first round arithmetic, which is Δ/2; correspondingly, in the third, fourth and fifth round arithmetic, the variation amounts are Δ/4, Δ/8, Δ/16, and the rest may be done in the same manner.

Formulas are as follows:

a first round: $x_1 = x + f(x,y)\Delta$ a second round:

$$x_2 = x_1 + f(x_1, y)\frac{\Delta}{2}$$

a third round:

$$x_3 = x_2 + f(x_2, y)\frac{\Delta}{4}$$

a fourth round:

$$x_4 = x_3 + f(x_3, y)\frac{\Delta}{8} \cdots,$$

And the $n^{th}$ round:

$$x_n = x_{n-1} + f(x_{n-1}, y)\frac{\Delta}{2^{n-1}}$$

in the formula:

$$f(x, y) = \begin{cases} 1 & x \leq y \\ -1 & x > y \end{cases}$$

then it is easy to derive:

$$\lim_{n \to \infty} x_n = \lim_{n \to \infty}\left[x_{n-1} + f(x_{n-1}, y)\frac{\Delta}{2^{n-1}}\right] = y$$

and for the results after n rounds of arithmetic, then:

$$|x_n - y| \leq \frac{\Delta}{2^{n-1}}$$

is workable, so that x and y is approaching equal.

In the disclosure, the magnitude sequence of the optical paths of the first synchronization party and the emitting party path (L1) and the second synchronization party and the emitting party path (L2) is realized by measuring and comparing the polarization entangled GHZ state, the optical path of L1 is continuously approached to L2 by using the binary iteration method, the two synchronization parties approach to the same time of measuring photons, and thus realizing the synchronization of two clocks.

In order to achieve the purpose, the disclosure provides the following technical scheme:

a binary iterative clock synchronization system based on polarization entanglement GHZ state comprises a first synchronization party, a second synchronization party and an emitting party;

the first synchronization party is connected with the second synchronization party through a classical channel, the emitting party is connected with the first synchronization party through a quantum channel, and the emitting party is connected with the second synchronization party through a quantum channel and a classical channel;

wherein: the emitting party is configured to generate three-photon polarization-entangled GHZ state and to measure one-photon polarization state among the three-photon polarization-entangled GHZ states.

The first synchronization party and the second synchronization party measuring the polarization states of the other two photon polarization state among the three-photon polarization-entangled GHZ states, and the second synchronization party and the emitting party compare the measurement results to obtain the measurement sequence information of the first synchronization party detecting the photon and the second synchronization party detecting the photon.

The emitting party comprises a GHZ state entanglement source, an optical delay line (ODL), a disc fiber, a third polaroid and a third detector;

the optical delay line is connected with the GHZ state entanglement source; the GHZ state entanglement source is connected with a third polaroid through a disc fiber; the third polaroid is connected to a third detector.

Preferably, the third polaroid is a 45-degree polaroid.

The first synchronization party comprises a first polaroid, a first detector, a first pulse Laser (Laser 1), a first clock, and a first optical circulator.

Preferably, the first polaroid is a horizontal polaroid.

The second synchronization party comprises a second polaroid, a second detector, a second pulse Laser (Laser 2), a second clock, and a second optical circulator.

Preferably, the second polaroid is a 45-degree polaroid.

In the emitting party, the GHZ state entanglement source is provided with three output ends, namely a first output end, a second output end and a third output end;

the first output end is connected with the input end of the optical delay line, passing through the optical delay line and the disc fiber, and is connected with the first synchronization party by an optical fiber; the second output end is directly connected with the second synchronization party through an optical fiber; and the third output end is connected with the input end of the third detector through the disc fiber and the third polaroid in sequence.

In the first synchronization party and second synchronization party: the first optical circulator and the second optical circulator are respectively provided with three ports, namely a first port, a second port and a third port;

the first port of the first optical circulator is connected with the first port of the second optical circulator;

the second port of the first optical circulator is connected with the output end of the first pulse laser; and the second port of the second optical circulator is connected with the output end of the second pulse laser.

the third port of the first optical circulator is connected with the input end of the first detector; and a third port of the second optical circulator is connected with the input end of the second detector.

The first clock is connected with the first pulse laser and the first detector; the second clock is connected with the second pulse laser and the second detector; the first polaroid is connected with the input end of the first detector; the second polaroid is connected to the second detector input.

The GHZ state entanglement source is configured to prepare a three-photon polarization entangled GHZ state with a quantum state $$\phi_0^{\pm} = \frac{1}{\sqrt{2}}(|H\rangle|H\rangle|H\rangle \pm |V\rangle|V\rangle|V\rangle);$$

the optical delay line is configured to adjust the optical delay between the first synchronization party and the emitting party so as to balance two arms between the first synchronization party and the emitting party and that between the second synchronization party and the emitting party; the disc fiber is configured to provide optical delay between the GHZ state entanglement source and the third detector, and simultaneously provide asymmetric tolerance between the first synchronization party and the emitting party, and asymmetric tolerance between the second synchronization party and the emitting party; the 45-degree polaroid is used for distinguishing a photon X-based polarization state; the third detector provides a detection response to the photons.

The polaroid in the first synchronization party is in the horizontal direction and is used for distinguishing the Z-based polarization state of photons; the polaroid in the second synchronization party is in a 45-degree direction, which is consistent with the polaroid of the emitting party in direction and is used for distinguishing the X-based polarization state of photons; the first detector and the second detector are configured to provide detection response to photons; the first pulse laser and second pulse laser generate classical laser pulses for realizing preliminary clock synchronization between a first synchronization party and a second synchronization party; the first clock and the second clock are clocks to be synchronized, which record the local time of detecting photons; the first optical circulator and the second optical circulator are both configured to provide a nonreciprocal optical path and realizing the bidirectional classical pulse signal exchange of the first synchronization party and the second synchronization party.

In the binary iterative clock synchronization system based on polarization entanglement GHZ state, an optical signal emitted by a first output end of a GHZ state entanglement source enters a first detector through an Optical Delay Line (ODL), a disc fiber, an optical fiber and a first polaroid sequentially; correspondingly, an optical signal emitted by a second output end of the GHZ state entanglement source enters a second detector through the optical fiber and a second polaroid sequentially; and the optical signal emitted by the third output end of the GHZ-state entanglement source enters a third detector through the disc fiber and a third polaroid sequentially. An optical signal emitted by a first pulse Laser (Laser 1) in a first synchronization party is input through a second port of a first optical circulator and is output through a first port of a first optical circulator, then the optical signal is input through a first port of a second optical circulator after being transmitted by an optical fiber and is output through a second port of a second optical circulator, and then enters a second detector; correspondingly, an optical signal emitted by a second pulse Laser (Laser 2) in a second synchronization party is input through a second port of a second optical circulator and is output through a first port of a second optical circulator, then the optical signal is input through a first port of a first optical circulator after being transmitted by an optical fiber and is output through a third port of a first optical circulator, and enters a first detector. The first clock at the first synchronization party and the second clock at the second synchronization party record the emission time and the arrival time of the optical signal.

A binary iterative clock synchronization method based on polarization entanglement GHZ state comprising the following steps:

S1: exchanging signals: the first pulse laser and the second pulse laser respectively provided in the first synchronization party and the second synchronization party excite classical pulse signals at the time-point "0" of respective clocks, and the signals are transmitted to each other through respective optical circulators.

S2: measuring signal: the first synchronization party and the second synchronization party respectively receiving signals sent by the optical circulator of the opposite party, transmitting the received signals to the local detector after the received signals passing through the local optical circulator, and the first synchronization party and the second synchronization party respectively measuring the arrival time $\tau_a$ and the arrival time $\tau_b$ by the first synchronization party and the second synchronization party, a conclusion is drawn:

$$\tau_a = T_{link} + \Delta T_{ab} \qquad \text{Formula (1)};$$

$$\tau_b = T_{link} - \Delta T_{ab} \qquad \text{Formula (2)};$$

wherein $T_{link}$ is the transmission time of the optical pulse in the optical path between the first detector and the second detector, and $\Delta T_{ab}$ is the clock difference between the first clock and the second clock.

S3: analyzing result: obtaining $T_{link}$ by simultaneous summation of the formulas (1) and (2) in the step S2; obtaining $\Delta T_{ab}$ by simultaneous difference of the formulas (1) and (2) in the step S2. Therefore, a rough value $\Delta T_{ab}$ between the first clock and the second clock can be obtained. And the first synchronization party and the second synchronization party perform initial calibration on the clock according to the difference value. The clock A and clock B have a clock difference after calibration in the range of $\Delta T_0$ considering the achievable accuracy of classical clock synchronization. ($\Delta T_0$ is typically on the magnitude of 10 ns).

S4: emitting light pulses: the emitting party simultaneously and respectively transmitting single photon pulses to the first synchronization party and the second synchronization party, and the first synchronization party and the second synchronization party respectively record the time $t_a$ and $t_b$ of receiving the light pulses and publish the measurement results.

S5: primarily adjusting the optical delay: the emitting party adjusting the optical delay line so that the result of the re-measurement meets $t_a=t_b$ based on the measured $t_a$ and $t_b$.

S6: emitting entangled states; emitting party preparing three photons in a polarization-entangled GHZ state, and the quantum state is as follows:

$$\phi_0^{\pm} = \frac{1}{\sqrt{2}}(|H\rangle|H\rangle|H\rangle \pm |V\rangle|V\rangle|V\rangle)$$

and simultaneously transmitting the states to the first detector, the second detector and the third detector.

S7: measuring and judging; the first synchronization party, the second synchronization party and the emitting party measuring the received photons. Wherein the measurement base selected by the first synchronization party is the Z-basis, and the measurement base selected by the second synchronization party and the emitting party is the X-basis. After several measurements, it can be determined which one of the first synchronization party and second synchronization party measures the photon first by comparing the measurement results of the emitting party and the second synchronization party.

S8: adjusting the optical delay; after the first round of measurement, if it is determined that the first synchronization party measures the photon first, the emitting party increases the optical delay between the first synchronization party and the emitting party by $\Delta T_0$, and if it is determined that the second synchronization party measures the photon first, the emitting party decreases the optical delay between the first synchronization party and the emitting party by $\Delta T_0$.

S9: performing measurement in multiple rounds; the first synchronization party, the second synchronization party and the emitting party continue to execute the step S6, the step S7 and the step S8, and start the second round of measurement and fine adjustment of optical delay. Wherein the difference is that the fine adjustment amount of the second round optical delay is $\Delta T_0/2$, which is half of the previous round. Then, perform the third, fourth and fifth round measurements ----, and the corresponding fine adjustment amounts of optical delay are $\Delta T_0/4$, $\Delta T_0/8$, $\Delta T_0/16$, ----, and the rest may be done in the same manner. The dichotomy is configured to adjust the optical delay, so as to make the two arms constantly tend to be balanced, and the time of the photon reaching the detector has high-precision simultaneity after multiple iterations.

S10: recording time to complete synchronization; each party performs multiple rounds of measurement according to actual precision requirements, and the first synchronization party and the second synchronization party respectively record the photon arrival time $T_a$ and $T_b$ of the last measurement. At this time, the difference between $\Delta T_{ab}=T_a-T_b$ and the actual clock difference is small enough so that $\Delta T_{ab}$ may be regarded as the actual clock difference, and the first synchronization party and the second synchronization party perform clock calibration according to the difference so as to realize the synchronization of the clocks.

Specifically, in the step S1, the first pulse laser and the second pulse laser excite a classical pulse signal at the time of "0" of their respective clocks, and the signals are transmitted to each other through their respective circulators; wherein, their respective clocks refer to the respective clocks of a first synchronization party and a second synchronization party, namely the first clock and the second clock; their respective optical circulators refer to the respective optical circulators of a first synchronization party and a second synchronization party, namely the first optical circulator and the second optical circulator.

Compared with the prior art, the disclosure has the following beneficial effects:

1. the transmission of the optical signals is unidirectional transmission, there is no requirements for the transmission speed of the signals in all directions, so there is less limitation, thus shortening the transmission path, and the influence of unstable factors of the optical fibers on the transmission process is less.
2. Quantum entanglement is a non-localization effect, has "instantaneity", which can reach a higher precision upper limit.
3. The synchronous both parties can perform iteration of different times according to the actual precision requirement, thus realizing the precision-efficiency optimization.

DETAILED DESCRIPTION

The following description of the embodiments of the present disclosure will be made with reference to the accompanying drawings.

Figure 4:
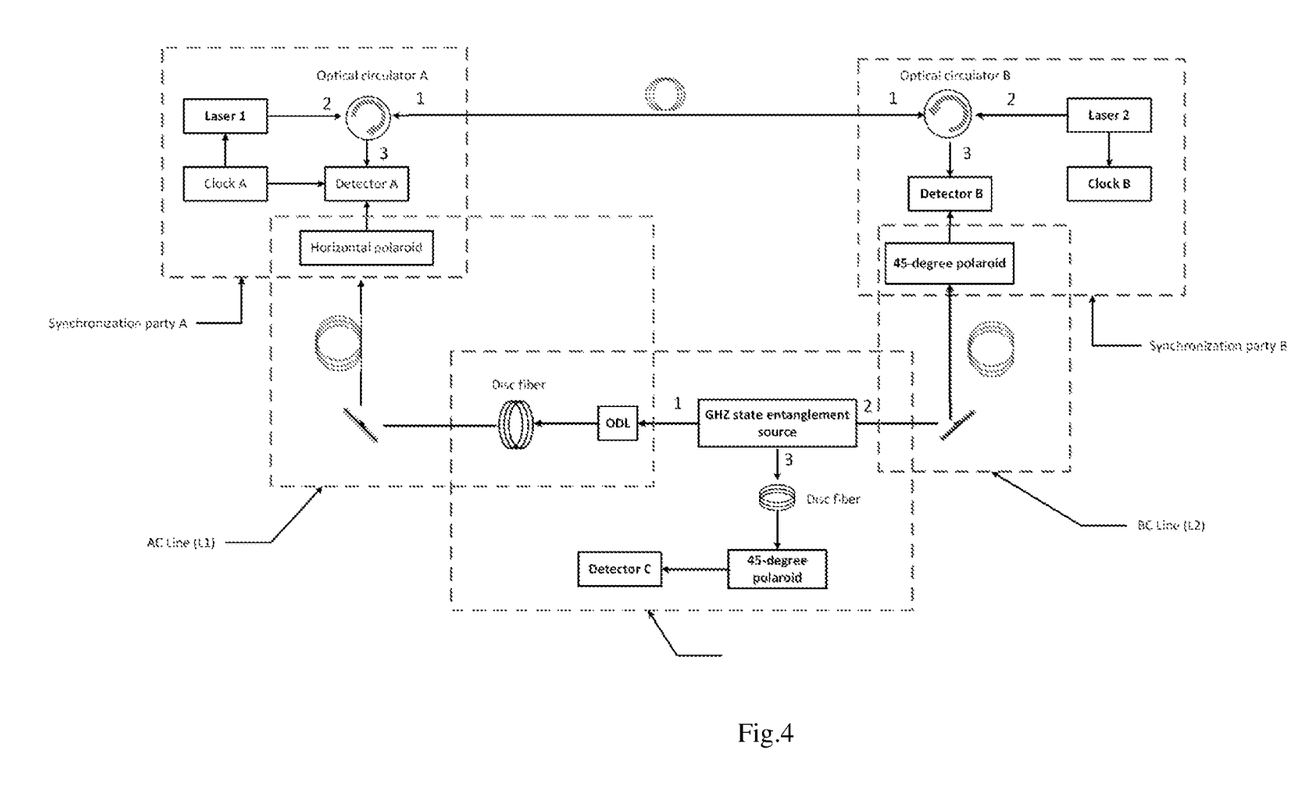
FIG. 4 is a block diagram of the overall arithmetic of the present disclosure.

As shown in FIG. 4, a binary iterative clock synchronization system based on polarization entanglement GHZ state comprises a first synchronization party, a second synchronization party and an emitting party. In this embodiment, corresponding to the drawings, the first synchronization party is a synchronization party A; the second synchronization party is a synchronization party B; the emitting party is an emitting party C;

the synchronization party A and the synchronization party B are connected through a classical channel, the emitting party C and the synchronization party A are connected through a quantum channel, and the emitting party C and the synchronization party B are connected through the quantum channel and the classical channel;

more specifically, the emitting party C is configured to prepare a three-photon polarization entangled GHZ state and measuring the polarization state of one photon. The synchronization party A and synchronization party B measure the polarization states of the other two photons, and the synchronization party B and the emitting party C compare the measurement results to obtain the measurement sequence information of the synchronization party A and synchronization party B.

Figure 3:
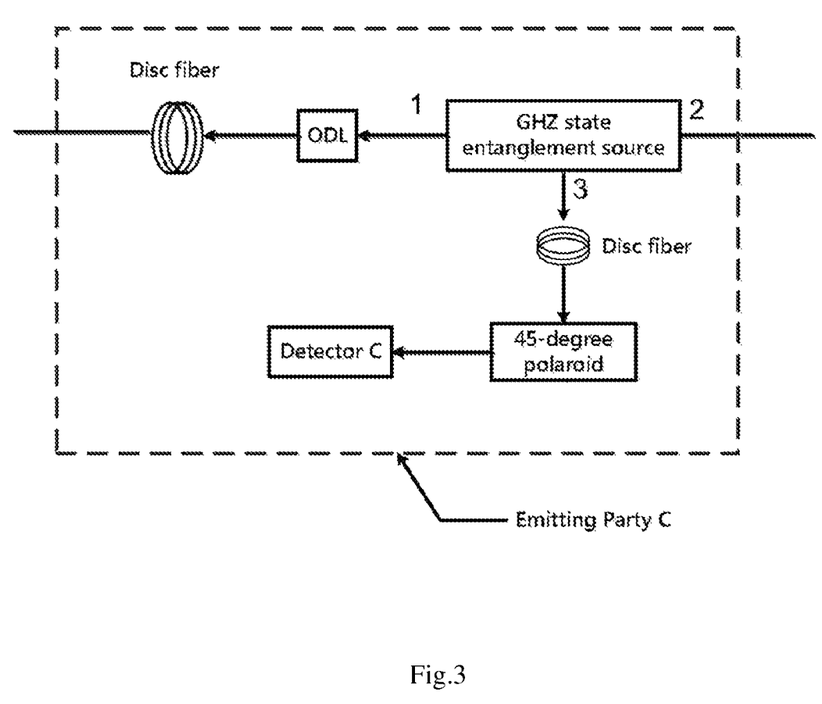
FIG. 3 is a block diagram of an emitting party C according to the present disclosure.

Specifically, as shown in FIG. 3, the emitting party C comprises a GHZ state entanglement source, an Optical Delay Line (ODL), a disc fiber, a 45-degree polaroid (third polaroid), and a detector C (third detector).

The GHZ state entanglement source is configured to prepare a three-photon polarization entangled GHZ state with a quantum state $$\phi_0^\pm = \frac{1}{\sqrt{2}}(|H\rangle|H\rangle|H\rangle \pm |V\rangle|V\rangle|V\rangle);$$

the optical delay line is configured to adjust the optical delay of the L1 so as to balance the two arms of the L1 and the L2; the disc fiber is configured to provide enough optical delay between the GHZ state entanglement source and the detector C, and simultaneously provides asymmetric tolerance of the two arms of L1 and L2; the 45-degree polaroid is used for distinguishing a photon X-based polarization state; the detector C provides a detection response to photons.

Figure 1:
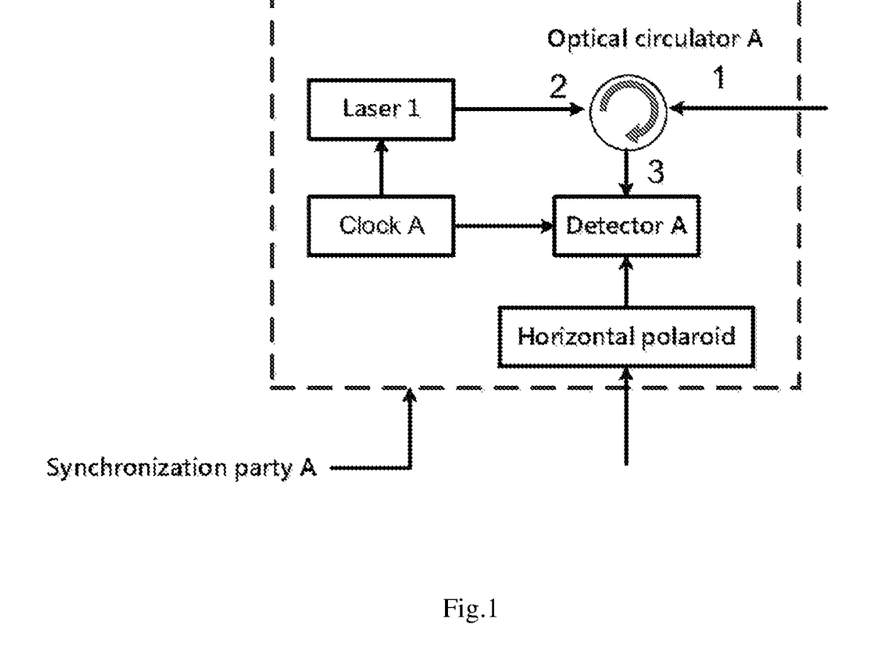
FIG. 1 is a block diagram of a synchronization party A according to the present disclosure.
Figure 2:
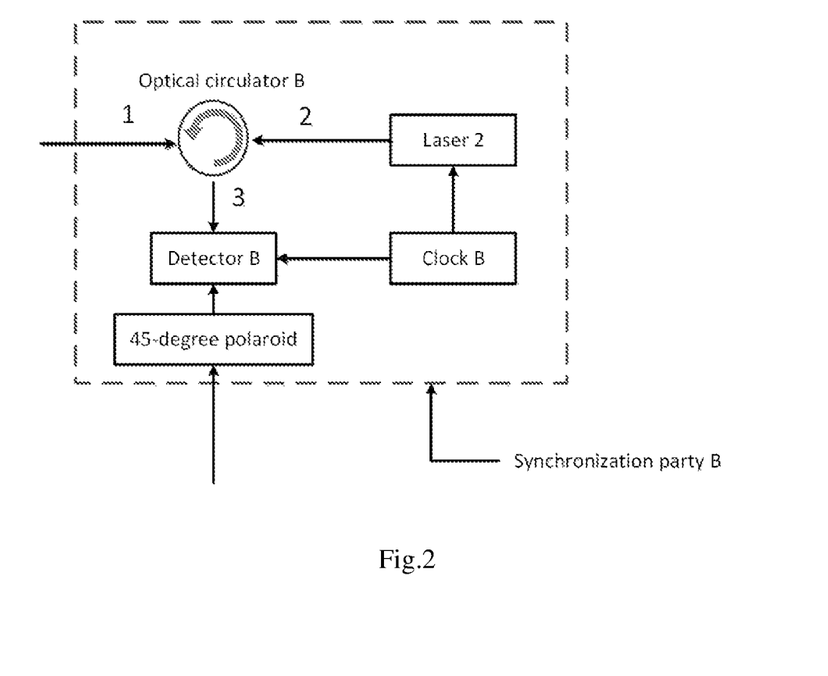
FIG. 2 is a block diagram of a synchronization party B according to the present disclosure.

As shown in FIGS. 1 and 2, the synchronization party A comprises a horizontal polaroid (first polaroid), a detector A (first detector), a Laser1 (first pulse Laser), a clock A (first clock), and an optical circulator A (first optical circulator).

The synchronization party B comprises a 45-degree polaroid (second polaroid), a detector B (second detector), a Laser2 (second pulse Laser), a clock B (second clock) and an optical circulator B (second optical circulator).

The emitting party C comprises: the GHZ state entanglement source is provided with three output ends. Wherein, the output end 1 (the first output end) is connected with the input end of the optical delay line and is connected with the synchronization party A through the optical delay line; the output end 2 (second output end) is directly connected with the synchronization party B through an optical fiber; and the output end 3 (a third output end) is connected with the input end of the detector C (a third detector) through the disc fiber and the 45-degree polaroid (a third polaroid) in sequence.

The synchronization party A and the synchronization party B: the optical circulator is provided with 3 ports, wherein the port 1 (first port) of the optical circulator A is connected with the port 1 (first port) of the optical circulator B; the port 2 (second port) of the optical circulator A and the port 2 (second port) of the optical circulator B are respectively connected with the output end of the laser of the respective synchronization party; and the port 3 (third port) of the optical circulator A and the port 3 (third port) of the optical circulator B are respectively directly connected with the input end of the detector of the respective synchronization party. The clock is connected with the laser and the detector. The polaroid is connected with the input end of the detector.

The polaroid of the synchronization party A is in the horizontal direction and is used for distinguishing the Z-based polarization state of photons; the polaroid of the synchronization party B is in a 45-degree direction, which is consistent with the polaroid of the emitting party C in direction and is used for distinguishing the X-based polarization state of photons; the detector provides a detection response to photons; the pulse laser generates classical laser pulses for realizing preliminary clock synchronization between a synchronization party A and a synchronization party B; the clock is a clock to be synchronized, and records the local time of the detector for detecting the photons; the optical circulator is configured to provide a nonreciprocal optical path and realize bidirectional classical pulse signal exchange of the synchronization party A and the synchronization party B.

In binary iterative clock synchronization system based on polarization entanglement GHZ state, an optical signal emitted by output end 1 of an GHZ state entanglement source enters a detector A through an optical delay line (ODL), a disc fiber, an optical fiber and a horizontal polaroid sequentially; correspondingly, an optical signal emitted by the output end 2 of the GHZ state entanglement source enters the detector B through the optical fiber and the 45-degree polaroid sequentially; and the optical signal emitted by the output end 3 of the GHZ-state entanglement source enters the detector C through the disc fiber and the 45-degree polaroid sequentially. An optical signal emitted by a Laser (Laser 1) of the synchronization party A is input through a port 2 of the optical circulator A and output through a port 1 of the optical circulator A, then it is transmitted by an optical fiber, and afterwards it is input through a port 1 of the optical circulator B and output through a port 3 of the optical circulator B, and finally it enters a detector B; correspondingly, an optical signal emitted by a Laser (Laser 2) of the synchronization party B is input through a port 2 of the optical circulator B and output through a port 1 of the optical circulator B, and then it is transmitted by an optical fiber, and it is input through the port 1 of the optical circulator A and output through a port 3 of the optical circulator A, and it finally enters the detector A. The clock A of the synchronization party A and the clock B of the synchronization party B record the emission time and arrival time of the optical signal.

Figure 5:
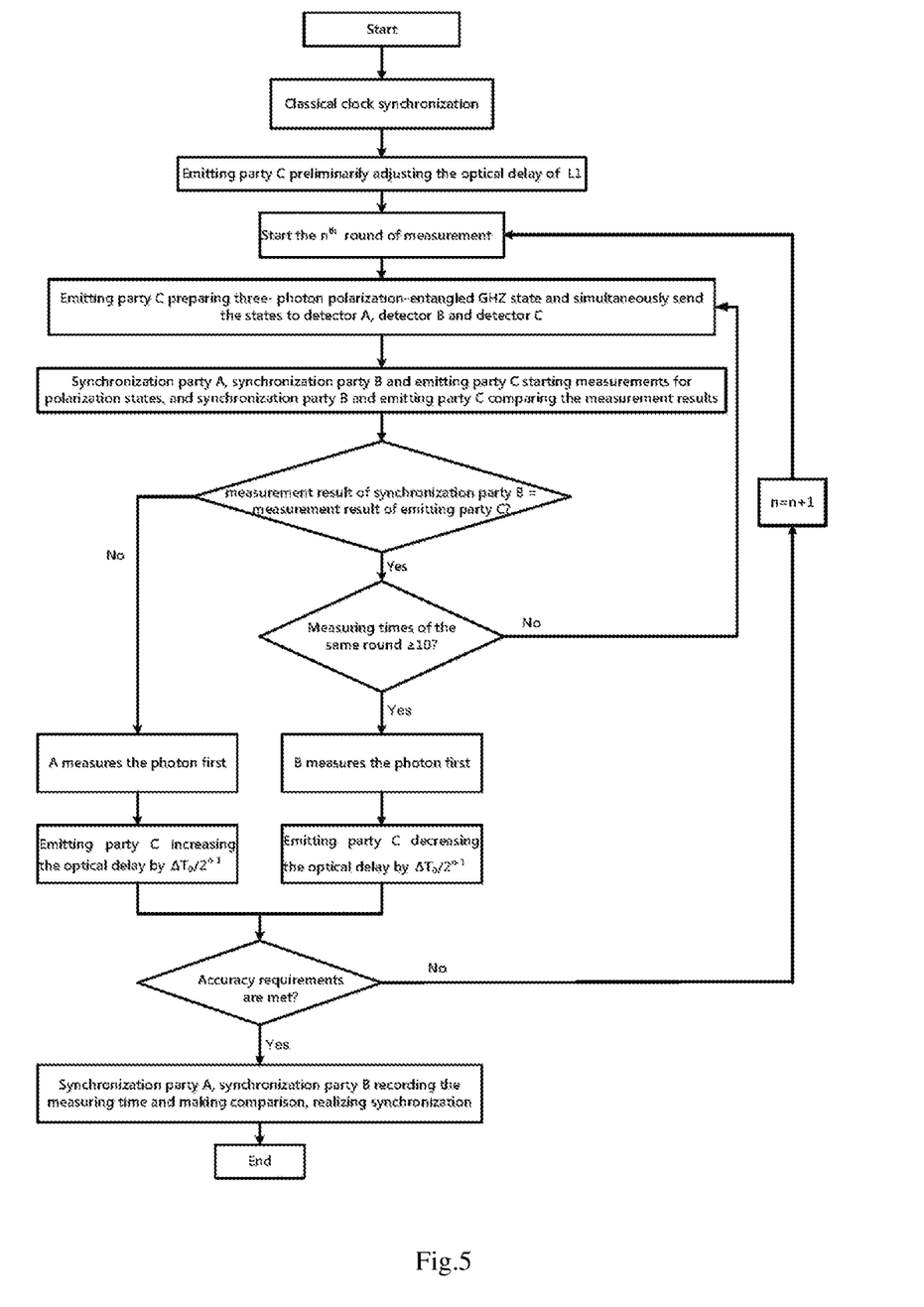
FIG. 5 is a flow chart of the present disclosure.

As shown in FIG. 5, the method for binary iterative clock synchronization system based on polarization entanglement GHZ state comprises the following steps:

S1: exchanging a classical signal; the pulse lasers of the synchronization party A and the synchronization party B excite classical pulse signals at the time of "0" of their respective clocks, and the signals are transmitted to each other through their respective circulators.

S2: measuring classical signal; in the synchronization party A and synchronization party B, signals from the other party pass through the circulators and are transmitted to the detector, and clock A to be synchronized of the synchronization party A and clock B to be synchronized of the synchronization party B record the arrival time of the signals $\tau_a$ and $\tau_b$ respectively. Then it is easy to obtain: $\tau_a = T_{link} + \Delta T_{ab}$ and $\tau_b = T_{link} - \Delta T_{ab}$. Wherein $T_{link}$ is the transmission time of the optical pulse in the optical path between the detector A and the detector B, and $\Delta T_{ab}$ is the clock difference between the clocks A and clock B.

S3: analyzing the classical measurement result;

$$\tau_a = T_{link} + \Delta T_{ab} \tag{1}$$

$$\tau_b = T_{link} - \Delta T_{ab} \tag{2}$$

Obtaining $T_{link}$ by simultaneous summation of the formulas (1) and (2); Obtaining $\Delta T_{ab}$ by simultaneous difference; and obtaining a coarse value $\Delta T_{ab}$ between the clock A and clock B. The clock A and clock B perform initial calibration according to the difference value. The clock A and clock B have a clock difference after calibration within the range of $\Delta T_0$, considering the accuracy achieved by classical clock synchronization. ($\Delta T_0$ is typically in a magnitude of 10 ns).

At this point, the synchronization party A and the synchronization party B completes the preliminary time synchronization, which lays a precondition foundation for a binary iterative clock synchronization method based on polarization entanglement GHZ state.

Based on the precondition formed by the classical clock synchronization method, a binary iterative clock synchronization method based on polarization entanglement GHZ state is developed:

S4: emitting light pulses; the GHZ state entanglement source of the emitting party C simultaneously transmits single photon pulses to the synchronization party A, synchronization party B and the local detector C, and the clocks to be synchronized of synchronization party A and synchronization party B respectively record the time $\tau_a$ and $\tau_b$ of receiving the light pulses.

S5: preliminarily adjusting the optical delay; the emitting party C adjusts the optical delay of L1 by the optical delay line (ODL) so that the result of the re-measurement meets $\tau_a = \tau_b$.

S6: emitting entangled states; the GHZ state entanglement source of the emitting party C prepares three-photon polarization-entangled GHZ state with the quantum state $$\phi_0^\pm = \frac{1}{\sqrt{2}}(|H\rangle|H\rangle|H\rangle \pm |V\rangle|V\rangle|V\rangle),$$

and simultaneously send the three-photon polarization-entangled GHZ state to detector A, detector B and detector C through a quantum channel.

S7: measuring and judging; the synchronization party A, synchronization party B and the detector of the emitting party C take measurements of the received photons. The front end of the detector A is provided with a horizontal polaroid, which corresponds to Z-based polarization measurement, and the front end of the detector B and the front end of C are provided with 45-degree polaroids, which correspond to X-based polarization measurement. After several measurements, It can be determined which one of the synchronization party A and synchronization party B measures photons first according to the comparison of the measurement results of the emitting party C and the synchronization party B through a judgment basis.

S8: adjusting the optical delay; after the first round of measurement, if it is determined that the synchronization party A measures the photon first, the emitting party C increases the optical delay of L1 by $\Delta T_0$ through optical delay line (ODL), and if it is determined that the synchronization party B measures the photon first, the emitting party C decreases the optical delay of L1 by $\Delta T_0$ through optical delay line (ODL).

S9: performing measurement in multiple rounds; the synchronization party A, the synchronization party B and the emitting party C continue to execute S6, S7 and S8, and start the second round of measurement and fine adjustment of optical delay. Wherein the difference is that the fine adjustment amount of the second round optical delay is $\Delta T_0/2$, which is half of the previous round. Then, perform the third, fourth and fifth round measurements ----, and the corresponding fine adjustment amounts of optical delay are $\Delta T_0/4$, $\Delta T_0/8$, $\Delta T_0/16$, ----, and the rest may be done in the same manner. The dichotomy is configured to adjust the optical delay, so as to make the two arms constantly tend to be balanced, and the time of the photon reaching the detector has high-precision simultaneity after multiple iterations.

S10: recording time to complete synchronization; each party performs multiple rounds of measurement according to actual precision requirements, and the clock to be synchronized of the synchronization party A and the clock to be synchronized of the synchronization party B respectively record the photon arrival time $T_a$ and $T_b$ of the last measurement. At this time, the difference between $\Delta T_{ab} = T_a - T_b$ and the actual clock difference is small enough so that $\Delta T_{ab}$ may be regarded as the actual clock difference, and the synchronization party A and the synchronization party B perform clock calibration according to the difference so as to realize the synchronization of the clocks.

Specifically, the judgment basis of the S7 is as follows:
the polarization-entangled GHZ state prepared by the emitting party C is as follows:

$$\phi_0^\pm = \frac{1}{\sqrt{2}}(|H\rangle|H\rangle|H\rangle \pm |V\rangle|V\rangle|V\rangle),$$

the entangled state has the following features:
1. measuring the polarization state of one photon, and the polarization states of the other two photons instantly collapses to the state of the measured photon;
2. the remaining two collapsed photons will no longer possess entanglement properties, measuring the polarization state of one of the photons have no effects on the polarization state of the other photon.
3. the GHZ state entanglement effect is a non-localization effect, has "instantaneity", and provides guarantee for the system to realize high-precision clock synchronization.

According to the above features of the GHZ entanglement state, on the premise of ensuring that the optical delay between the entanglement source and the detector C is greater than the optical delays of L1 and L2, the measurement results of the detector A and the detector B will have the following two conditions:

the first condition is as follows: if the synchronization party A measures a photon first, then the polarization states of all three photons will be projected onto the Z-basis, and then the measurement of the synchronization party B and the emitting party C will again project the remaining two photon polarization states onto the X-basis, and at this time the two photons are no longer entangled, then the synchronization party B and the emitting party C will have a probability of 1/2 to obtain different measurements.

And a second condition: if the synchronization party B measures a photon first, then the polarization states of all three photons will be projected onto the X-basis, and since the synchronization party B has the same measurement base as the emitting party C, the synchronization party B and the emitting party C will always have the same measurement results.

In actual measurements, once the synchronization party B and synchronization party C obtain different measurement results, it can be determined as the first condition. However, it inevitably happens that where the same measurement result is obtained by a plurality of measurements, so that it cannot be determined the specific situation. But as the number of measurements increases, the probability of the first condition also decays exponentially. On the premise that m times of the same measurement result are obtained in succession, the probability of the first condition is P(m)=$2^{-m}$. At this point, it can be stipulated that: if ten times of the same measurement results are obtained in succession, it may be determined as the second condition. In this condition, the error rate E(m)=P(m)=$2^{-m}$=$2^{-10}$ is controlled to be relatively low, approximately one-thousandth.

Specifically, in the S10, both the synchronization party A and the synchronization party B participate in the measurement of the signal arrival time. In consideration of actual configuration, the selection of the measuring bases of both the synchronization party A and the synchronization party B is realized by a polaroid. That is, there is a probability of 1/2 for the detector A and detector B failing to respond simultaneously in each measurement, resulting in a failure to acquire the final time. However, as mentioned above, each round of measurement may comprise multiple measurements, it may not be difficult to make the detector A and detector B to respond simultaneously so as to obtain the measuring time $T_a$ and $T_b$.

The accuracy of the synchronization result can be evaluated by the binary iteration method, and assuming having performed n rounds measurement, the clock difference obtained in the last round of measurement is $\Delta T_{ab}$, and the actual clock difference is $\Delta T$. It is not difficult to draw a conclusion:

$$|\Delta T_{ab} - \Delta T| \leq \frac{\Delta T_0}{2^{n-1}}$$

therefore, the synchronization precision exponentially rises along with the number of measurement rounds, the precision of clock synchronization can be evaluated according to the above formula, and the number of rounds to be measured can be determined according to the formula and the specified precision requirement.

(1). In the disclosure, the transmission of the optical signals is unidirectional transmission, there is no requirements on the transmission speed of the signals in all directions, there is less limitation, and the transmission path is shortened, so that there is less influence of unstable factors of the optical fibers on the transmission process.

(2). The GHZ state entanglement effect of the present disclosure is a non-localization effect, has "instantaneity", which can reach a higher precision upper limit.

(3). In the disclosure, both the synchronization party A and the synchronization party B may execute different times of iteration according to the actual precision requirement, thus achieving the precision-efficiency optimization.

Those skilled in the art may make variations and modifications to the above-described embodiments based upon the disclosure and teachings of the above specification. Therefore, the present disclosure is not limited to the specific embodiments disclosed and described above, and modifications and variations of the present disclosure are also intended to fall within the scope of the appended claims. Furthermore, although specific terms are provided herein, they are used in a generic and descriptive sense only and not for purposes of limitation.

What is claimed:

1. A binary iterative clock synchronization system based on polarization entanglement GHZ state, wherein, comprising: a first synchronization party, a second synchronization party and an emitting party;

the first synchronization party is connected with the second synchronization party through a classical channel, the emitting party is connected with the first synchronization party through a quantum channel, and the emitting party is connected with the second synchronization party through a quantum channel and a classical channel;

the emitting party is configured to generate three-photon polarization-entangled GHZ states and to measure one-photon polarization state among the three-photon polarization-entangled GHZ states;

the first synchronization party and the second synchronization party measuring the polarization states of the other two photon polarization state among the three-photon polarization-entangled GHZ states, and the second synchronization party and the emitting party comparing the measurement results to obtain the measurement sequence information of the first synchronization party detecting the photon and the second synchronization party detecting the photon.

2. The system according to claim 1, wherein: the emitting party comprises a GHZ state entanglement source, an optical delay Line (ODL), a disc fiber, a third polaroid and a third detector;

the optical delay line is connected with the GHZ state entanglement source; the GHZ state entanglement source is connected with a third polaroid through a disc fiber; the third polaroid is connected to a third detector.

3. The system according to claim 2, wherein: the GHZ state entanglement source is provided with three output ends, namely a first output end, a second output end and a third output end;

the first output end is connected with the input end of the optical delay line, passing through the optical delay line and the disc fiber, and is connected with the first synchronization party through an optical fiber; the second output end is directly connected with the second synchronization party through an optical fiber; and the third output end is connected with the input end of the third detector through the disc fiber and the third polaroid in sequence.

4. The system according to claim 2, wherein: the GHZ state entanglement source is configured to prepare a three-photon polarization entangled GHZ state with a quantum state $$\phi_0^{\pm} = \frac{1}{\sqrt{2}}(|H\rangle|H\rangle|H\rangle \pm |V\rangle|V\rangle|V\rangle);$$

the optical delay line is configured to adjust the optical delay between the first synchronization party and the emitting party;

the disc fiber is configured to provide optical delay between the GHZ state entanglement source and the third detector, and simultaneously provide asymmetric tolerance between the first synchronization party and the emitting party, and asymmetric tolerance between the second synchronization party and the emitting party;

the third polaroid is a 45-degree polaroid used for distinguishing a photon X-based polarization state;

the third detector provides a detection response to the photons.

5. The system according to claim 1, wherein: the first synchronization party comprises a first polaroid, a first detector, a first pulse Laser, a first clock, and a first optical circulator;

the second synchronization party comprises a second polaroid, a second detector, a second pulse Laser, a second clock, and a second optical circulator;

the first clock is connected with the first pulse laser and the first detector; the second clock is connected with the second pulse laser and the second detector;

the first polaroid is connected with the input end of the first detector; the second polaroid is connected to the input end of the second detector.

6. The system according to claim 5, wherein: in the first synchronization party and second synchronization party, the first optical circulator and second optical circulator is each provided with three ports respectively identified as a first port, a second port, and a third port.

7. The system according to claim 6, wherein: the first port of the first optical circulator is connected with the first port of the second optical circulator;

the second port of the first optical circulator is connected with the output end of the first pulse laser;

the second port of the second optical circulator is connected with the output end of the second pulse laser;

the third port of the first optical circulator is connected with the input end of the first detector;

and the third port of the second optical circulator is connected with the input end of the second detector.

8. The system according to claim 5, wherein: the first polaroid is a horizontal polaroid and is used for distinguishing a photon Z-based polarization state;

the second polaroid is a 45-degree polaroid used for distinguishing a photon X-based polarization state.

9. The system according to claim 5, wherein: the first detector and the second detector are configured to provide detection response to photons;

the first pulse laser and second pulse laser generate classical laser pulses for realizing preliminary clock synchronization between the first synchronization party and the second synchronization party;

the first clock and the second clock are clocks to be synchronized, and simultaneously record a local time for the first detector and the second detector detecting photons;

the first optical circulator and second optical circulator are configured to provide a nonreciprocal optical path.

* * * * *